(12) United States Patent
Beukema

(10) Patent No.: US 10,812,301 B1
(45) Date of Patent: Oct. 20, 2020

(54) TIME DEPENDENT LINE EQUALIZER FOR DATA TRANSMISSION SYSTEMS

(71) Applicant: INTERNATIONAL BUSINESS MACHINES CORPORATION, Armonk, NY (US)

(72) Inventor: Troy Beukema, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/667,875

(22) Filed: Oct. 29, 2019

(51) Int. Cl.
*H04L 25/03* (2006.01)

(52) U.S. Cl.
CPC .............. *H04L 25/03885* (2013.01)

(58) Field of Classification Search
CPC ............. H04L 25/03885; H04L 25/03987
See application file for complete search history.

(56) References Cited

U.S. PATENT DOCUMENTS

| | | | |
|---|---|---|---|
| 5,945,862 A * | 8/1999 | Donnelly | H03K 5/1565 327/241 |
| 2003/0183842 A1 * | 10/2003 | Kizer | G06F 1/10 257/158 |
| 2004/0135612 A1 * | 7/2004 | Kim | H03H 11/26 327/271 |
| 2009/0060017 A1 * | 3/2009 | Zerbe | H04L 25/03025 375/229 |
| 2018/0083607 A1 * | 3/2018 | Kanomata | G06F 1/04 |
| 2018/0113835 A1 * | 4/2018 | Tajalli | H04L 25/03267 |

OTHER PUBLICATIONS

List of IBM Patents or Applications Treated as Related. (2 pgs.).
Boesch, R. "Signal Preconditioning Using Feedforward Equalizers in ADC-Based Data Links"; http://purl.stanford.edu/dk653rc7126 (2016); 158 Pgs.

* cited by examiner

*Primary Examiner* — Jean B Corrielus
(74) *Attorney, Agent, or Firm* — Intelletek Law Group, PLLC; Gabriel Daniel, Esq.

(57) ABSTRACT

A dynamic tap weight generator circuit includes a clock generator circuit having a first output and a second output. There is a current interpolator circuit coupled to a first current source and a second current source and to the first and second outputs of the clock generator circuit and operative to provide a first output and a second output providing a differential output current between a current of the first current source and a current of the second current source across a symbol transmission interval. A 2:1 current multiplexer is coupled to a first and second outputs of the current interpolator circuit. A tap weight driver is coupled to an output of the 2:1 current multiplexer and configured is to dynamically adjust a tap weight of an equalizer dynamically during each clock cycle of the clock generator.

21 Claims, 14 Drawing Sheets

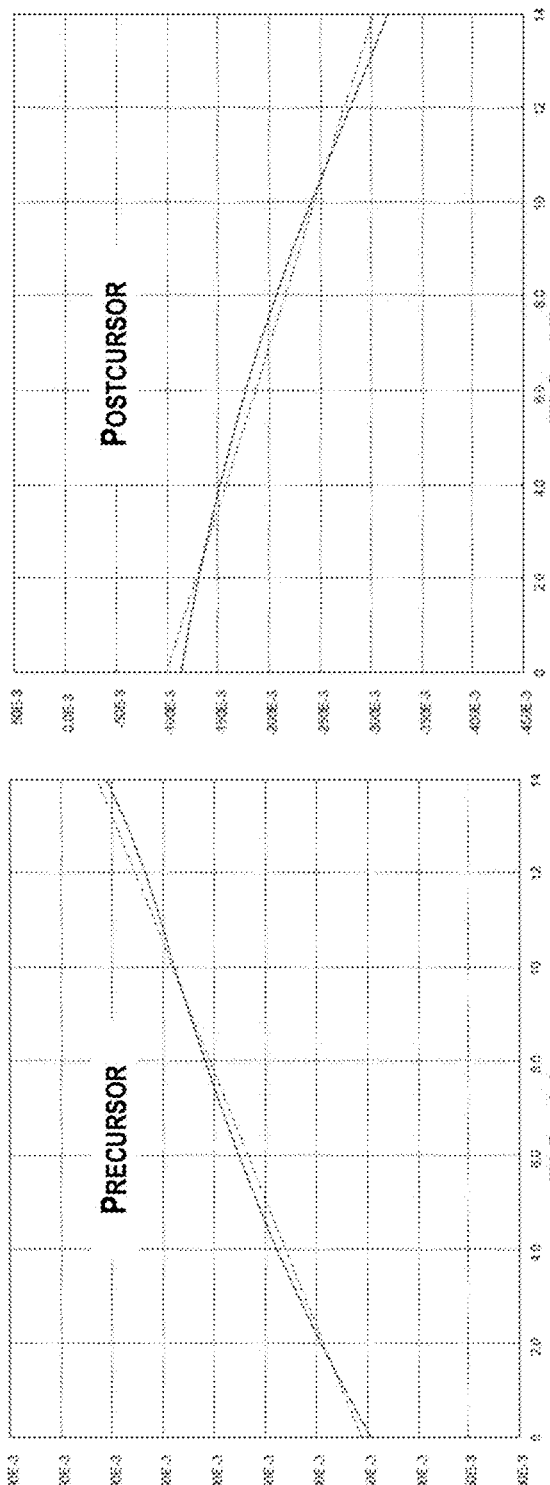
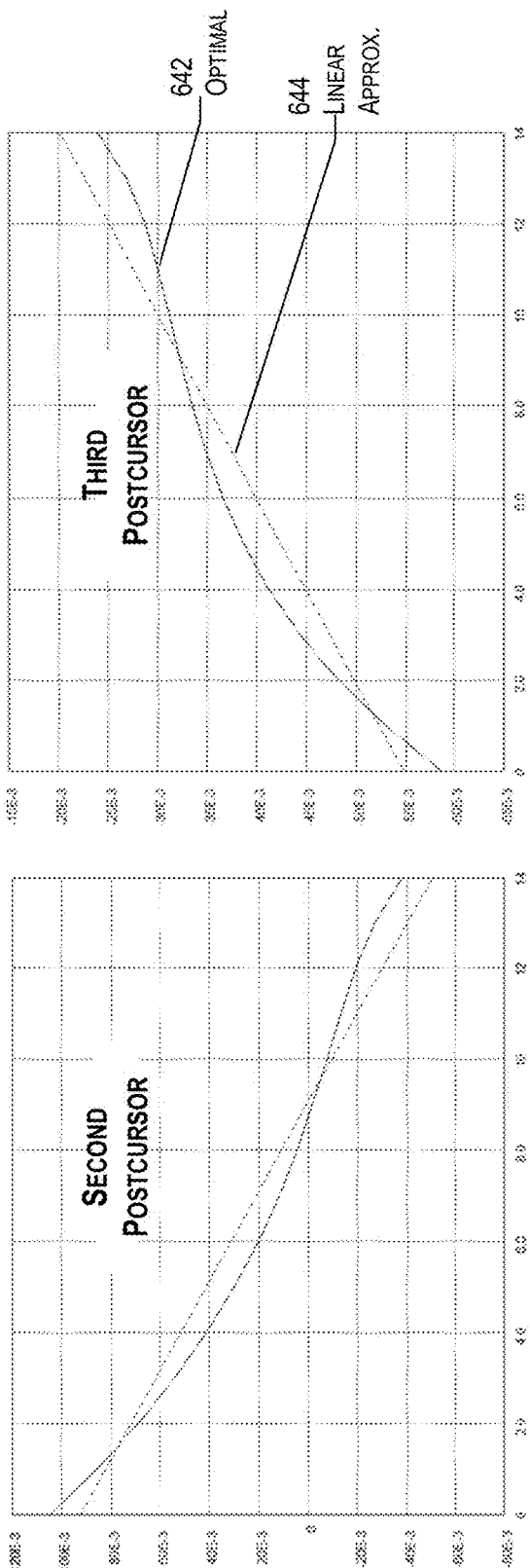
FIG. 6A — Precursor
FIG. 6B — Postcursor
FIG. 6C — Second Postcursor
FIG. 6D — Third Postcursor (642 Optimal, 644 Linear Approx.)

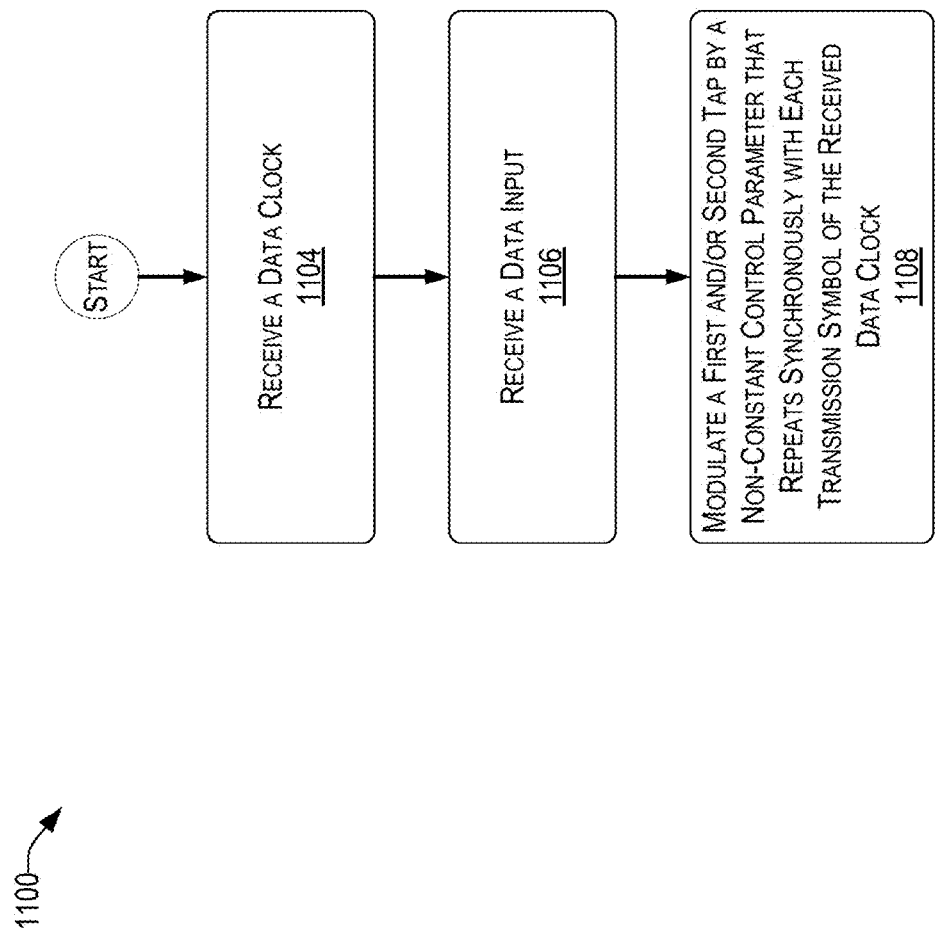

TIME DEPENDENT LINE EQUALIZER FOR DATA TRANSMISSION SYSTEMS

BACKGROUND

Technical Field

The present application generally relates to telecommunication systems, and more particularly, to equalization in high rate data transmission systems.

Description of the Related Art

Modern electrical data transmission systems in networking and computing systems typically use equalization techniques to lower distortion arising from channel time dispersion and resulting inter-symbol interference (ISI). In known systems, these equalization techniques are commonly based on the use of feed-forward equalization (FFE) in a transmitter and/or receiver device, combined with receiver continuous-time equalization (CTE) and decision-feedback equalization (DFE) in some systems. A goal of the equalization system includes to remove as much ISI as possible at a data sample time in the receiver to improve the recoverable bit-error rate (BER). As data rates in modern systems continue to rise to 100 Gb/s and beyond, the clock accuracy achievable in a practical implementation can begin to limit system performance significantly. At these high data rates, a full transmit symbol period may be 20 ps or lower. The known equalization systems based on use of FFE/CTE/DFE remove ISI at one specific time point within this 20 ps interval. Due to practical limitations in achievable clock accuracy, any given receiver sample may sample the equalized signal later or earlier than the specific time point, which is equalized, resulting in degraded BER and ultimately limiting the maximum achievable data rate due to practical limits of achievable clock accuracy.

SUMMARY

According to one embodiment, dynamic tap weight generator circuit includes a clock generator circuit having a first output and a second output. A current interpolator circuit is coupled to a first current source and a second current source and to the first and second outputs of the clock generator circuit and operative to provide a first output and a second output providing an interpolated output current between a current of the first current source and a current of the second current source across a symbol transmission interval. A 2:1 current multiplexer is coupled to a first and second outputs of the current interpolator circuit. A tap weight driver is coupled to an output of the 2:1 current multiplexer and is configured to dynamically adjust a tap weight of an equalizer during each clock cycle of the clock generator.

In one embodiment, the first output of the clock generator circuit is a substantially triangular waveform and the second output of the clock generator circuit is a substantially rectangular waveform that is synchronous to the first output of the clock generator circuit.

In one embodiment, the first and second outputs of the clock generator circuit are differential.

In one embodiment, the current interpolator circuit includes a first transistor and a second transistor having a common first node coupled to the first current source. A third transistor and a fourth transistor having a common first node is coupled to the second current source. A control node of the first transistor and a control node of the fourth transistor are coupled to a positive terminal of the first output of the clock generator circuit. A control node of the second transistor and a control node of the third transistor are coupled to a negative terminal of the first output of the clock generator circuit.

In one embodiment, the first current source provides a starting current for the interpolator circuit, and the second current source provides a stopping current for the interpolator circuit.

In one embodiment, the 2:1 current multiplexer includes a fifth transistor and a sixth transistor having a common first node coupled to a first output of the interpolator circuit. A seventh transistor and an eighth transistor having a common first node are coupled to a second output of the interpolator circuit. A control node of the fifth transistor and a control node of the eighth transistor are coupled to a positive terminal of the second output of the clock generator circuit. A control node of the sixth transistor and a control node of the seventh transistor are coupled to a negative terminal of the second output of the clock generator circuit.

In one embodiment, a second node of the fifth transistor and a second node of the eighth transistor are coupled to ground. A second node of the sixth transistor and a control node of the seventh transistor are coupled to a catch diode. The catch diode may be an NFET having its gate coupled to its drain, and its source coupled to ground.

In one embodiment, wherein the full-rate tap weight driver includes a first NFET having its gate coupled to a first tap polarity control, its drain coupled to a first termination load; a second NFET having its gate coupled to a second tap polarity control, and its drain coupled to a second termination load; and a third NFET having its drain coupled to emitters of the first and second NFETS of the full-rate tap weight driver, its gate coupled to the gate of the catch diode.

In one embodiment, the first current source provides a starting current $I_{START}$ and the second current source provides a stopping current source $I_{STOP}$.

In one embodiment, the dynamic tap weight generator circuit is part of a feed forward equalizer (FFE) and configured to control a tap weight of at least one of the taps of the FFE.

In various embodiments, the dynamic tap weight generator circuit can be part of a transmitter circuit or receiver circuit.

In one embodiment, the adjustment of the tap weight at the output of the dynamic tap weight generator circuit is a linear ramp during each clock cycle of the clock generator. The linear ramp may have a zero slope.

In one embodiment, the adjustment of the tap weight at the output of the dynamic tap weight generator circuit is a is a non-linear function.

In one embodiment, the first, second, third and fourth transistors of the current interpolator circuit are NFET devices. Similarly, the fifth, sixth, seventh and eighth transistors of the current multiplexer circuit may be NFET devices.

According to one embodiment, a method of providing a dynamic tap weight, includes providing a circuit having a clock generator, current interpolator coupled to the clock generator, and a current multiplexer coupled to the current interpolator and the clock generator. A first clock signal is provided to the current interpolator and a second clock signal to the current multiplexer, by the clock generator. A first output current and a second output current are interpolated between a current of a first current source and a current of a second current source, across a symbol transmission interval, by the current interpolator, based on the first clock signal. The first output current and the second output current of the current interpolator are multiplexed, based on the second clock signal. A full-rate tap weight driver is coupled to an output of the current multiplexer to provide a differential output of a control parameter that repeats synchronously with each transmission symbol to dynamically modulate a tap weight of an equalizer.

In one embodiment, the first output of the clock generator is a substantially triangular waveform. The second output of the clock generator is a substantially rectangular waveform that is synchronous to the first output of the clock generator.

In one embodiment, the first and second outputs of the clock generator circuit are differential.

In one embodiment, the first current source provides a starting current for the interpolator circuit, and the second current source provides a stopping current for the interpolator circuit.

By virtue of the features discussed herein, a robust 100 Gb/s 4 level data transmission over long-reach (25 dB+loss) channels is provided by improving HEYE margin up to three-fold. Various transmission systems, including 100 Gb/s systems are able to function more reliably with a lower bit error rate (BER). In general, the teachings herein increase the HEYE margin by two, three, or more times—compared to static equalizers. Still further, the jitter tolerance (JTOL) of a communication system is improved while the requirement for jitter on the system clocks are relaxed.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 6A to 6D illustrate the tap weights for the precursor (i.e., FIG. 6A), the postcursor (i.e., FIG. 6B), the second postcursor (i.e., FIG. 6C), and the third postcursor (i.e., FIG. 6D) of an example 5 tap FFE.

FIG. 7A illustrates the HEYE marking where the tap weights are fixed.

FIG. 8A illustrates an eye diagram of an example time variant feed forward line equalizer where the tap weights are fixed.

FIG. 9A illustrates an eye diagram of another example time variant feed forward line equalizer where the tap weights are fixed.

FIG. 10A illustrates an eye diagram of yet another example time variant feed forward line equalizer where the tap weights are fixed.

FIG. 11 presents a process for performing an equalization of a data signal, consistent with an illustrative embodiment.

DESCRIPTION

Overview

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As used herein, equalization refers to the removal of distortion incurred by a signal transmitted through a channel. The teachings herein provide an enhanced equalization systems and methods based on time-dependent equalization, where the time dependence of the equalization is synchronized to the data transmission interval such that the equalizer can apply changing equalization throughout the transmission interval of each transmitted symbol. By virtue of the equalization architecture discussed herein, the ISI is lowered over a wider time span within the symbol transmission period compared to a known feed forward equalization (FFE) techniques, which use tap weights that are nominally constant for the duration of a symbol transmission period. In turn, this enables a data transmission system to operate at lower BER in the presence of jitter of system clocks, which is typically unavoidable. To facilitate the present discussion, a feed forward equalization FFE architecture is described by way of example only, not by way of limitation.

Example Architecture

Figure 1:
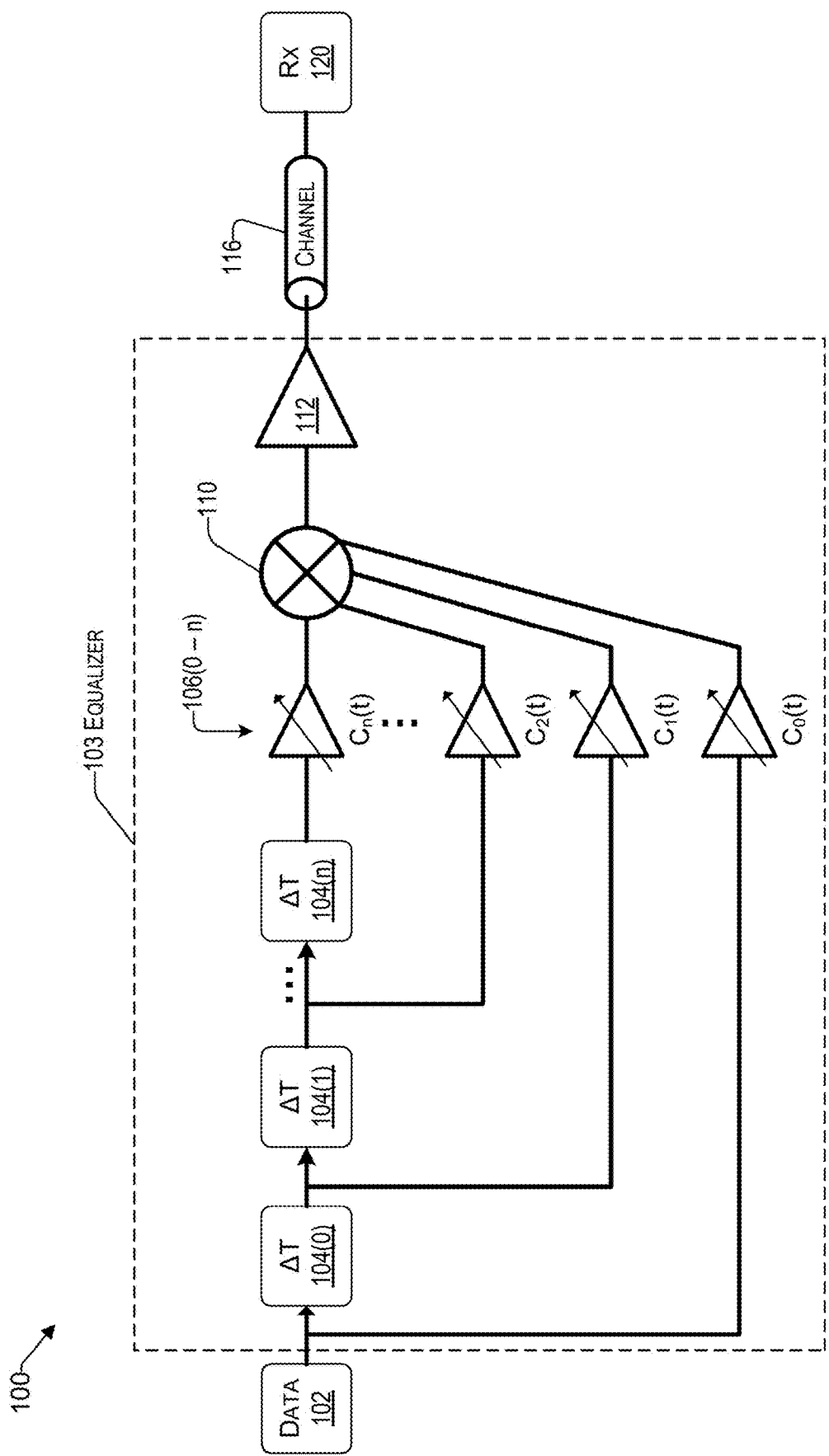
FIG. 1 is an example block diagram of a data transmission system, consistent with an illustrative embodiment.

FIG. 1 is an example block diagram of a data transmission system, consistent with an illustrative embodiment. The system 100 includes a data source 102, an equalizer 103, a transmission channel 116, and a data receiver 120. In one embodiment, the equalizer 103 is a transversal FFE that creates a weighted sum of time-delayed values of a transmit symbol sequence. The equalizer 103 includes a plurality of taps 106(0) to 106(n) coupled to different stages of a data signal provided by the data source 102. For example, the data source 102 is operative to provide transmission symbols that change state synchronously with a clock signal (not shown). That signal is conditioned in different stages by signal conditioning elements 104(0) to 104(n). In one embodiment, the signal conditioning elements are delay elements that operative to delay the signal received, each by its corresponding time period.

The data from the data source 102 can be encoded onto the transmit symbols using various techniques, such as (without limitation) NRZ (non-return to zero), 4-PAM (pulse amplitude modulation), 8-PAM, or 32-QAM (quadrature amplitude modulation), etc., where the number indicates the distinct number of constellation points that are used to convey the information. The summation node 110 is operative to receive all the taps 106(0) to 106(n) and provide an output to a buffer 112. In one embodiment, current mode logic is used to sum a current at the output of the different taps 106(0) to 106(n). Alternatively, other known summation circuits may be used to perform the summation of the signals of the different paths.

Significantly, one or more of the weights of the weighted sum created by the transversal equalizer 103 may be varied within a symbol transmission interval to accomplish improved equalization across a wider time span. Conceptually, the variation of the weights can be found to derive tap weights from the end-to-end channel response as illustrated in FIG. 1. Stated differently, unlike traditional FFE's that have tap weights that are constant (i.e., do not vary during a symbol transmission interval), at least one of the taps 106(0) to 106(n) is modulated by a dynamic control parameter that repeats synchronously with each transmission symbol. Thus, known FFE tap weight determination methods may find FFE tap weights at time point t0 of an end-to-end channel response, whereas the teachings herein provide at least one tap weight that may vary dynamically with time during a clock cycle. This concept may be better understood in view of the discussion below.

Figure 2:
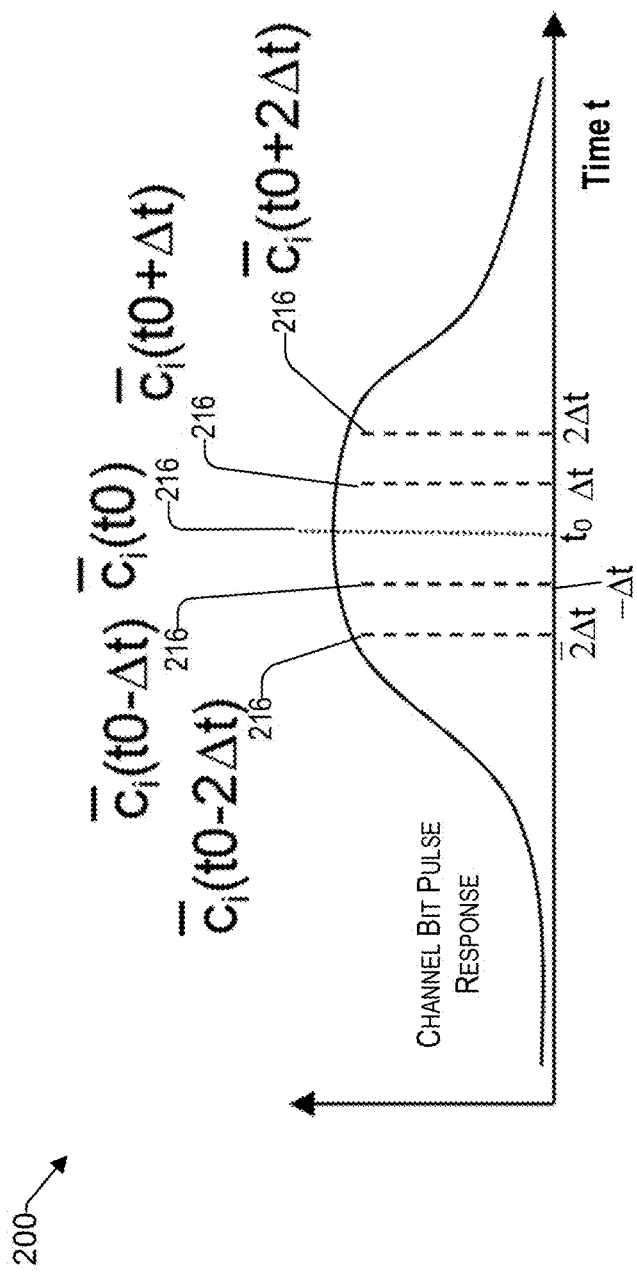
FIG. 2 illustrates a channel bit pulse response in the context of a time variant equalization of at least one of the taps of FIG. 1.

Reference now is made to FIG. 2, which illustrates channel bit pulse response 200 in the context of a time dependent equalization of at least one of the taps 160(0) to 160(n) of FIG. 1. To determine appropriate tap-weight variation to achieve equalization over a wider time interval, instead of fixing the tap-weight to a particular tap weight, a range of times around the nominal t0 equalization point $(t_0-2\Delta_t, t_0-\Delta_t, t_0, t_0+\Delta_t, t_0+2\Delta_t,$ etc.) may be considered, where t is (e.g., an arbitrary) small time step within the period of the symbol transmission interval. At each of these times a new set of equalization FFE coefficients $c_i$ are found. Improved equalization is then achieved by applying time dependent coefficient weights to the FFE, which pass through the computed tap weights across time. In one embodiment, to simplify the practical realization of the time-dependent equalizer, the change in coefficient tap weight as a function of time can be approximated with a linear ramp that passes through the optimal values as shown in the bit pulse response 200. In such embodiment, one or more taps of an FFE can be configured with two parameters, (i) a tap weight and (ii) a tap ramp value or rate of change, or alternately, (i) a start tap weight and (ii) a stop tap weight. The concept of the modulation of the tap weight that repeats synchronously with each transmission symbol can be better understood in view of example waveforms of timing diagrams, discussed below.

Example Timing Diagrams

Figure 3:
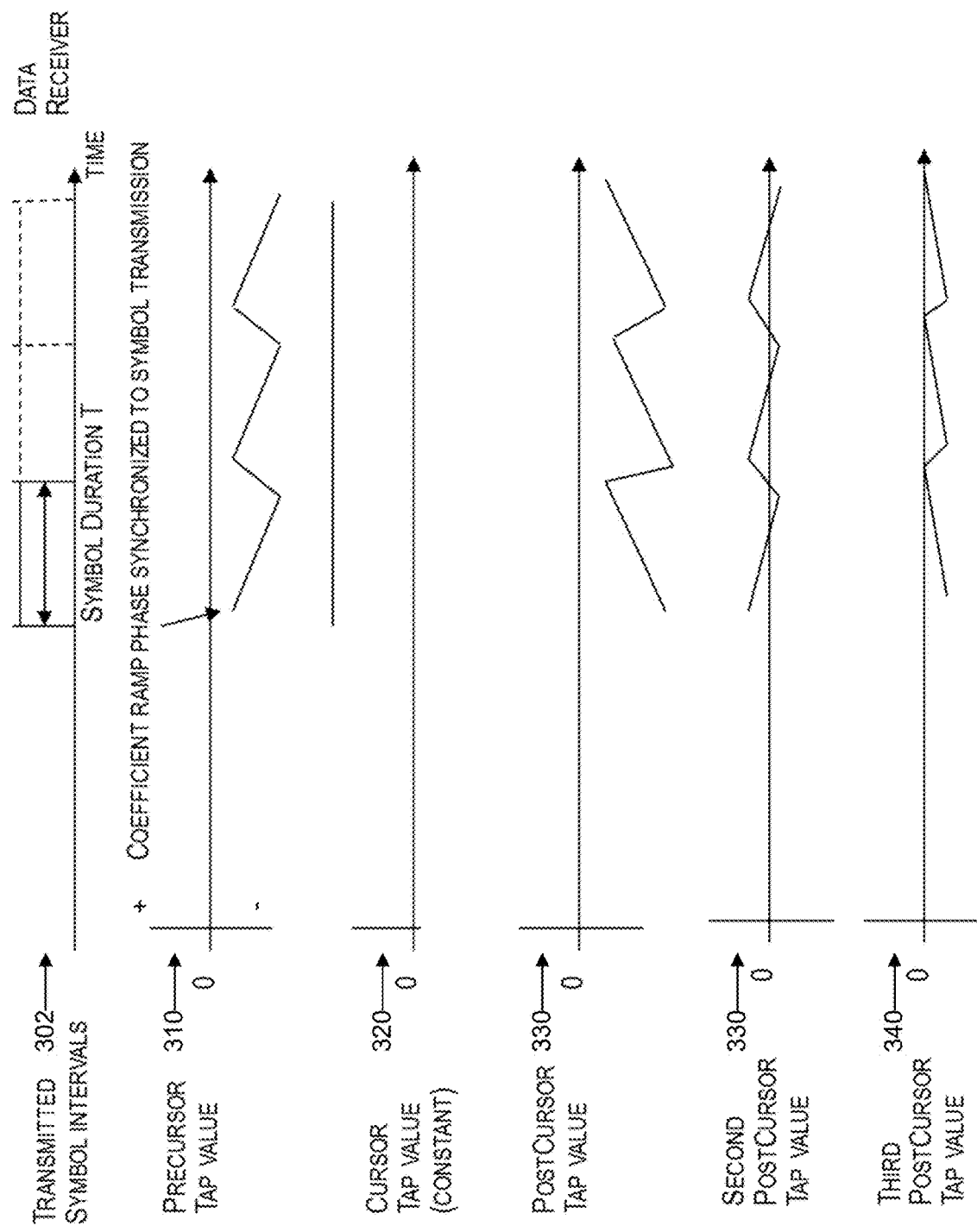
FIG. 3 depicts waveforms of tap values for different taps, for different data symbols.

Reference now is made to FIG. 3, which depicts waveforms of tap values for different taps for different data symbols. By way of example only, and not by way of limitation, FIG. 3 illustrates how the tap weights of a 5-tap FFE changes over time, for an example channel, where the x axis of the tap weight plots is given in units corresponding to time increments of 1/32 of a symbol transmission interval. To facilitate the present discussion, in the example of FIG. 3, a linear rate of change approximation of the tap weights is used, while it will be understood that any other function is supported by the teachings herein as well. Waveform 302 depicts the transmitted symbol intervals. The tap values, sometimes referred to herein as tap weights, are synchronous to the transmitted symbol intervals. For example, the waveform 310 of the precursor tap value has a coefficient ramp phase synchronized to the transmission symbol 302. This coefficient ramp phase 310 is a dynamic control parameter of the tap that repeats synchronously with the transmission symbol 302. In some embodiments, the dynamic control parameter changes between transmission symbols 302.

It is noted that not all taps need to be subject to a dynamic control parameter. In various embodiments, one or more taps may have a dynamic control parameter, while the remaining taps are static, or constant through a symbol transmission interval. In this regard, by way of example, FIG. 3 illustrates the cursor tap value 320 to be constant for each transmission symbol. Thus, the FFE cursor tap 320 in the example of FIG. 3 is fixed, while the tap values for the precursor 310, postcursor 330 second postcursor 330, and third postcursor 340 are modulated in time synchronously with the data transmission interval 302. In this way, improved ISI compensation over a wider time interval is achieved.

Example Circuit Diagram

Figure 4A:
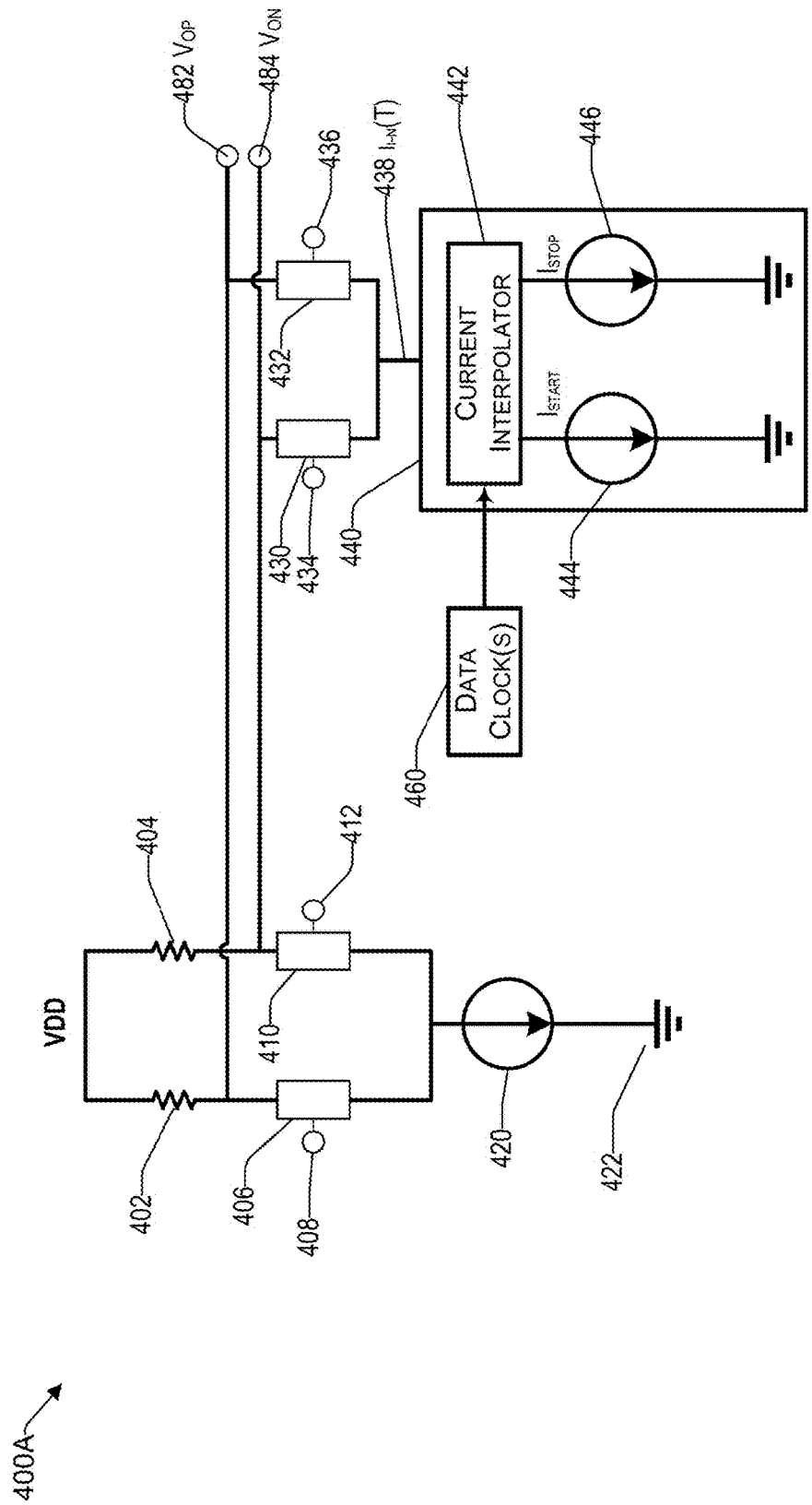
FIG. 4A illustrates an example feed forward equalizer circuit using current-mode logic.

With the foregoing explanation of the theoretical operation and waveforms of equalization systems, it may be helpful to describe an example circuit diagram that could be used implement the equalizer of FIG. 1. In this regard, FIG. 4A illustrates an example FFE equalizer circuit 400 using current-mode logic, consistent with an example embodiment. The circuit 400 includes differential loads 402 and 404, which may be resistors, each having a first node coupled to a first reference node, which in the present example is VDD. In the example of FIG. 4A, there are two taps: the first represented by differential transistors 406 and 410 coupled to current source 420, and the second represented by differential transistors 430 and 432 coupled to synchronous time dependent tap generator 440.

In various embodiments, the transistors 408, 412, 430, and 436 may be based on complementary metal-oxide-semiconductor (CMOS) technology, such as n-channel field effect transistors (NFET) and/or p-channel field effect transistors (PFET). In some embodiments, bipolar transistors (e.g., PNP or NPN) can be used instead of MOS transistors. Transistor pair 406 and 410 has a common emitter (or source) coupled to a current source 420. The current source is coupled to a second reference node, which may be ground 422. For example, the inputs of the first transistor pair 406 and 408 have control inputs 408 and 412, respectively, (e.g., gates or base inputs) that are operative to receive data signals differentially. For example, input 408 may receive data signal D1, whereas input 412 receives its complement (e.g., D1). In one embodiment, the non-return to zero (NRZ) signaling is used. In the example of FIG. 4A the first tap has a constant current source 420. Stated differently, the magnitude of the tap weight does not vary with time during a transmission symbol. Inputs 434 and 436 control the polarity of the applied tap weight as a function of data history and tap sign.

The fixed weight cursor tap is formed by switching a fixed current 420 based on the data symbol sign to output load 402 and 404, forming transmit output signal $V_O$ represented differentially by $V_{OP}$ 482 and $V_{ON}$ 484. In one embodiment, a fixed weight of the cursor tap with index "i" is formed by current-summing a fixed weight current switched by the sign of the data at index "i" ($S_i$).

In contrast, the second tap does not provide a tap weight that is constant. Rather, it is able to vary the tap weight throughout each transmission symbol. To that end, in one embodiment, the synchronous time dependent tap weight generator 440 may have a current interpolator 442 coupled to a plurality of current sources that can be selected at different points in time during a clock cycle. For example, there may be a first current source ($I_{START}$) 444 and a second current source ($I_{STOP}$) 446. Accordingly, to the sum of the differential output $V_{OP}$ 482 and $V_{ON}$ 484, a variable-weight current having at least one given tap index "i" using a synchronous time dependent tap weight generator is provided. In one embodiment, the synchronous dynamic tap weight generator 440 is implemented using a current interpolator 442 that is capable of interpolating from current $I_{START}$ 444 toward current $I_{STOP}$ 446 across a symbol transmission interval, where values for $I_{START}$ 444 and $I_{STOP}$ 446 may be programmatically pre-configured or automatically adapted by other systems, such as an adaptive equalization control system, given the new ability to control at least two tap configuration parameters (e.g., Istart and Istop) to minimize intersymbol interference across a wider time span.

Figure 4B:
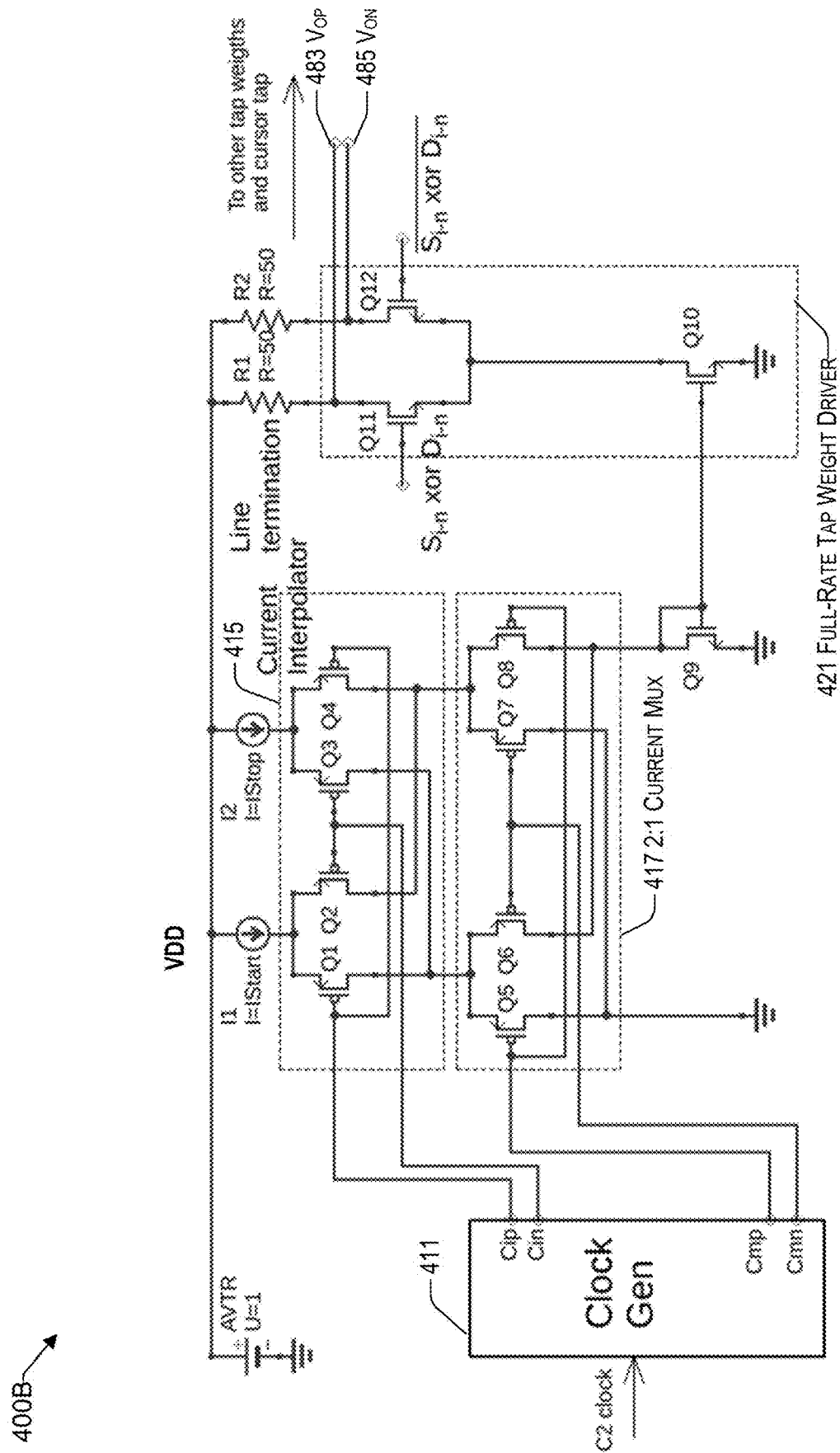
FIG. 4B depicts a hardware implementation of the dynamic tap weight generator using CMOS circuitry, consistent with an illustrative embodiment.

FIG. 4B illustrates a hardware implementation of the dynamic tap weight generator using, by way of example only and not by way of limitation, CMOS circuitry. In one embodiment, a half-rate or C2 clock drives a clock generator block 460. The clock generator produces two differential output clocks, Ci (or interpolator clock), and Cm or (multiplexer clock). In one embodiment, the synchronous time dependent tap weight generator 440 is responsive to configuration parameters that enable both a ramp slope and a ramp offset to be configured by controlling values of a start current and a stop current across a symbol transmission interval.

For example, at unit symbol intervals removed from the cursor tap, the FFE circuit 400A switches an FFE tap current 420 based on the sign of the FFE tap multiplied with the sign of the data (for NRZ transmission) to the output signal $V_{OP}/V_{ON}$ (482,484), forming an equalized output signal. The FFE circuit 400A varies the current of the second FFE tap dynamically by using the synchronous dynamic tap weight generator 440. The synchronous dynamic tap weight generator 440 is responsive to an input clock 460 related to the symbol transmission intervals and programmatic controls, which enable configuration of a start current $I_{START}$ 444 and a stop current $I_{STOP}$ 446. In one embodiment, through each data transmission interval, the tap weight current nominally begins at a value of $I_{START}$ 444 and ramps toward a value of $I_{STOP}$ 446 at the end of the symbol transmission interval, providing the desired variation in applied equalization as a function of time. The synchronous dynamic tap weight generator 440 is responsive to at least one system clock to enable the dynamic tap weight generator 440 to produce a current ramp 438 synchronized to a data transmission interval. While FIG. 4A describes the circuit 400 by way of example having a differential architecture, it will be understood that a single ended approach is supported by the teachings herein as well.

Figure 5:
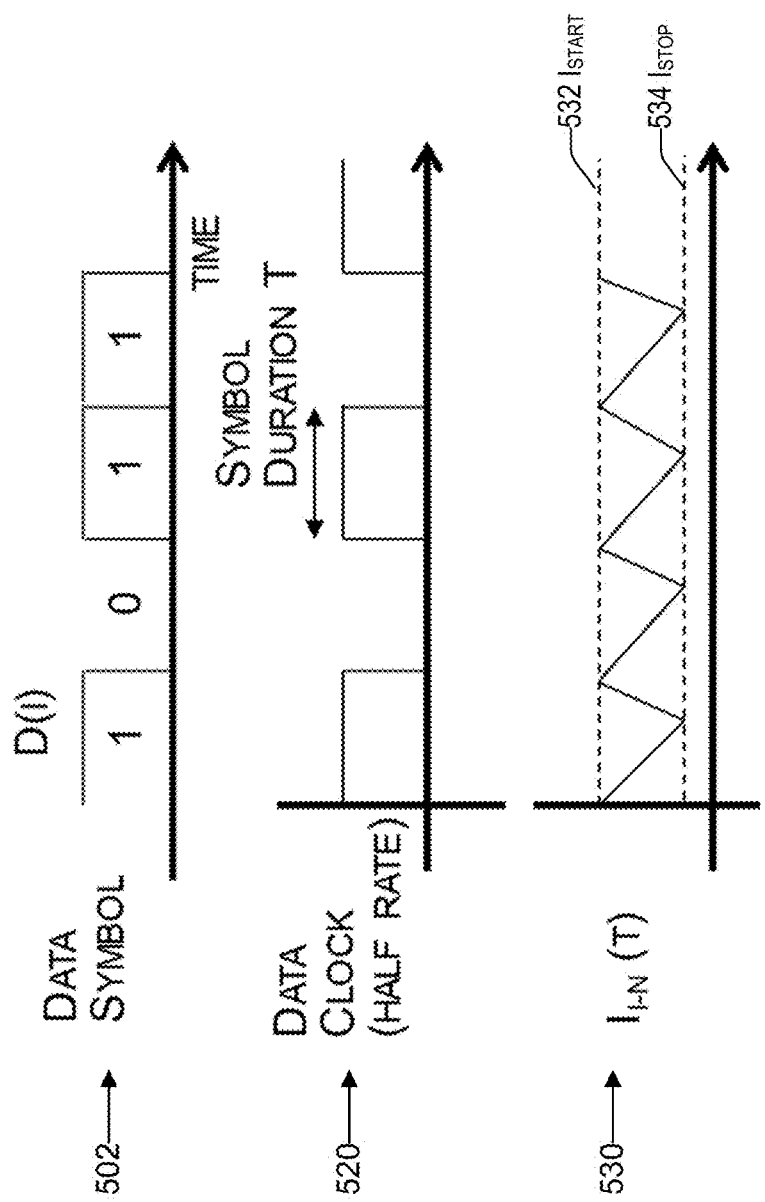
FIG. 5 depicts waveforms of tap values for different taps for different symbols.

The circuit diagram of FIG. 4A may be better understood in view of example waveforms. To that end, FIG. 5 depicts waveforms of tap values for different taps for different symbols. The data symbol, which are represented by binary values "0" and "1," is illustrated by waveform 502. Waveform 520 represents the data clock to which the data symbol 502 is synchronous to. The dynamic tap weight current at node 438 of FIG. 4A varies between $I_{START}$ and $I_{STOP}$ and is synchronous to the data clock 520. In one embodiment, the tap current is a linear ramp $I_{START}$ 532 and $I_{STOP}$ 534.

Reference now is made to FIG. 4B, which illustrates a dynamic tap weight generator circuit 400B, consistent with an exemplary embodiment. By way of example only, and not by way of limitation, the circuit 400B is illustrated using CMOS technology. The tap weight generator circuit 400B includes a clock generator circuit 411 that has a first set of differential outputs Cip/Cip that are coupled to a current interpolator circuit 415. The clock generator block 411 has a second set of differential outputs Cmp and Cmn that are coupled to the differential inputs of a 2:1 current multiplexer 417.

The current interpolator 415 comprises two PFETS Q1 and Q2 having a common source coupled to a first current source (I1) operative to provide a first current IStart. The current interpolator further comprises two PFETS Q3 and Q4 having a common source coupled to a second current source 12 operative to provide a second current IStop. The gate of PFETS Q1 and Q4 are coupled to the positive terminal Cip, while the gates of transistors Q2 and Q3 are coupled to the negative terminal Cin of the first differential clock output.

The 2:1 current multiplexer circuit 417 has a similar structure to that of the current interpolator and is therefore not repeated here for brevity. A first output of the current interpolator circuit 415 (i.e., at the common drain of PFETS Q1 and Q3) is coupled to the common source of PFETS Q5 and Q6 of circuit 417. A second output of the current interpolator circuit 415 (i.e., at the common drain of PFETS Q2 and Q4) is coupled to the common source of PFETS Q7 and Q8 of circuit 417. The gate of PFETS Q5 and Q8 are coupled to the positive terminal Cmp, while the gates of transistors Q6 and Q7 are coupled to the negative terminal Cmn of the second differential clock output. The drain of PFETS Q5 and Q7 is coupled to a common level (e.g., ground). The drain of PFETS Q6 and Q8 is coupled to a current source, represented by NFET Q9 having its gate coupled to its gate. There is a driver circuit, which may be a full-rate tap weight driver 421 comprising two NFETS Q11 and Q12 having a common source coupled to a current source, represented by NFET Q10.

Figure 4C:
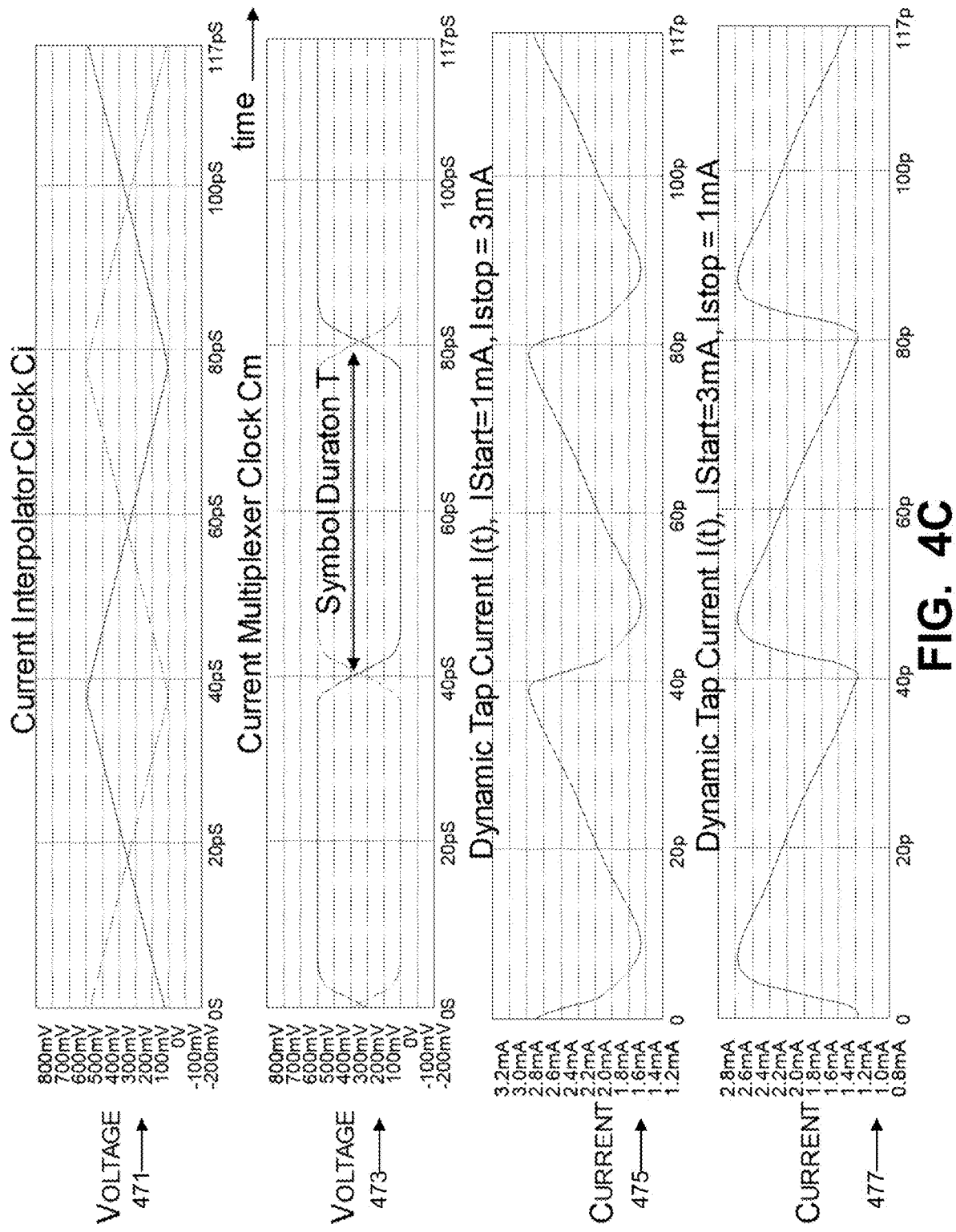
FIG. 4C illustrates example waveforms of the tap weight generator circuit of FIG. 4B.

The operation of the dynamic tap weight generator circuit 400B may be better understood in view of its waveforms. To that end, FIG. 4C illustrates example waveforms of the tap weight generator circuit 400B of FIG. 4B. Accordingly, the operation of the tap weight generator circuit 400B is discussed with reference to the waveforms of FIG. 4C.

In the embodiment of FIG. 4B, the synchronous dynamic tap weight generator 400B is realized using a current interpolator 415 that is capable of interpolating from current Istart toward current Istop across a symbol transmission interval, where values for Istart and Istop may be programmatically pre-configured or automatically adapted as previously discussed. In one embodiment, a half-rate or C2 clock drives a clock generator block 411. The clock generator block 411 produces two differential output clocks, Ci or interpolator clock, and Cm or multiplexer clock, illustrated by waveforms 471 and 473, respectively, in FIG. 4C. In one embodiment, the interpolator clock Ci 471 is a triangle waveform at the same frequency as the input C2 clock of FIG. 4B, with a swing appropriate to drive a current interpolator circuit 415, comprising PMOS devices Q1, Q2, Q3, and Q4. In the example waveforms show in FIG. 4C, the interpolator triangle waveform 471 varies from 0 to 0.5V to drive the gates of the PMOS current interpolator devices Q1 to Q4 of FIG. 4B. The PMOS current interpolator 415 provides outputs to a PMOS 2:1 current multiplexer 417 formed by PMOS devices Q5, Q6, Q7, and Q8.

The current interpolator clock Cm, illustrated by waveform 473, drives the current switches in the current multiplexer 417 to feed a 2:1 multiplexed current into NMOS catch diode Q9, configured as an NFET having its gate and drain coupled together, producing the desired full-rate current ramp waveform to control the weight of a tap. In the example waveforms shown in FIG. 3C, the interpolator clock Cm 473 varies from 0 to 0.5V with a nominal square-wave shape to rapidly switch the current multiplexer 417 state. The catch diode Q9 combined with tail current device Q10, form a current mirror to produce dynamic tap weight current I(t), which is then switched to the line driver termination outputs 483 and 485 through NMOS transistors Q11 and Q12, based on the sign of the tap weight Si-n multiplied with the sign of the data Di-n (for NRZ transmission).

Two example dynamic current generator configurations are shown in the waveforms of FIG. 4C. More particularly, waveform 475 illustrates generation of a tap weight current that increases in time through the symbol transmission interval, while waveform 477 illustrates generation of a tap weight current that decreases in time through the symbol transmission interval. In one embodiment, the phase of clocks Ci 471 and Cm 473 can be adjusted to center the transient part of the dynamic current (when it is switching from Istop to Istart) at a desired location within the symbol transmission interval, for example near the transition edges of the data waveform. The data waveform itself is not shown in FIG. 4C, but it will be understood that it is nominally synchronous to the cm clock 473.

In an example where the main or cursor tap was programmed with a 10, mA fixed current, the normalized dynamic tap weight varies nominally from 0.1 to 0.3. It will be understood that due to bandwidth limitation in circuits, the actual programmed start and stop currents may not correspond exactly to 1 mA and 3 mA, but the current ramp slope corresponding to a variation in tap weight from 0.1 to 0.3 across a symbol transmission provides a good representation.

In some scenarios, a desired ramp slope may cause a change in tap sign through a data transmission interval, involving a tap weight configuration to a negative current, which may not be adequately provided by the described current interpolation circuit of FIG. 4B. In one embodiment, to simplify the implementation, if a tap weight variation would change signs from Istart to Istop, (i.e., Istart being positive and Istop being negative), then Istop is saturated to a small value. Alternately, if Istop is significantly larger in absolute value than Istart, the sign of the tap weight Si can be inverted, Istop made positive, and Istart saturated to a small value. In another embodiment, a polarity crossing may be achieved through the use of a second static equalizer tap combined with the dynamic equalizer tap, where the static equalizer tap and dynamic equalizer tap are applied to opposite polarities of the output. As an example, a static tap value of normalized weight 0.2 on one polarity combined with a ramp varying from 0.1 to 0.3 normalized weight on the other polarity results in a net 0.1 to −0.1 normalized weight of the combined static and dynamic tap.

Example Results

The benefits of the systems and methods described herein may be better appreciated with some practical simulation results. To that end, different equalization tap waveforms and the corresponding "eye diagrams" of the equalized data signal are provided in FIGS. 6 to 10, respectively. The "eye diagrams" in the figures can be analyzed using various known statistical techniques to produce horizontal eye (HEYE) and vertical eye (VEYE) operating margin metrics.

Figure 7B:
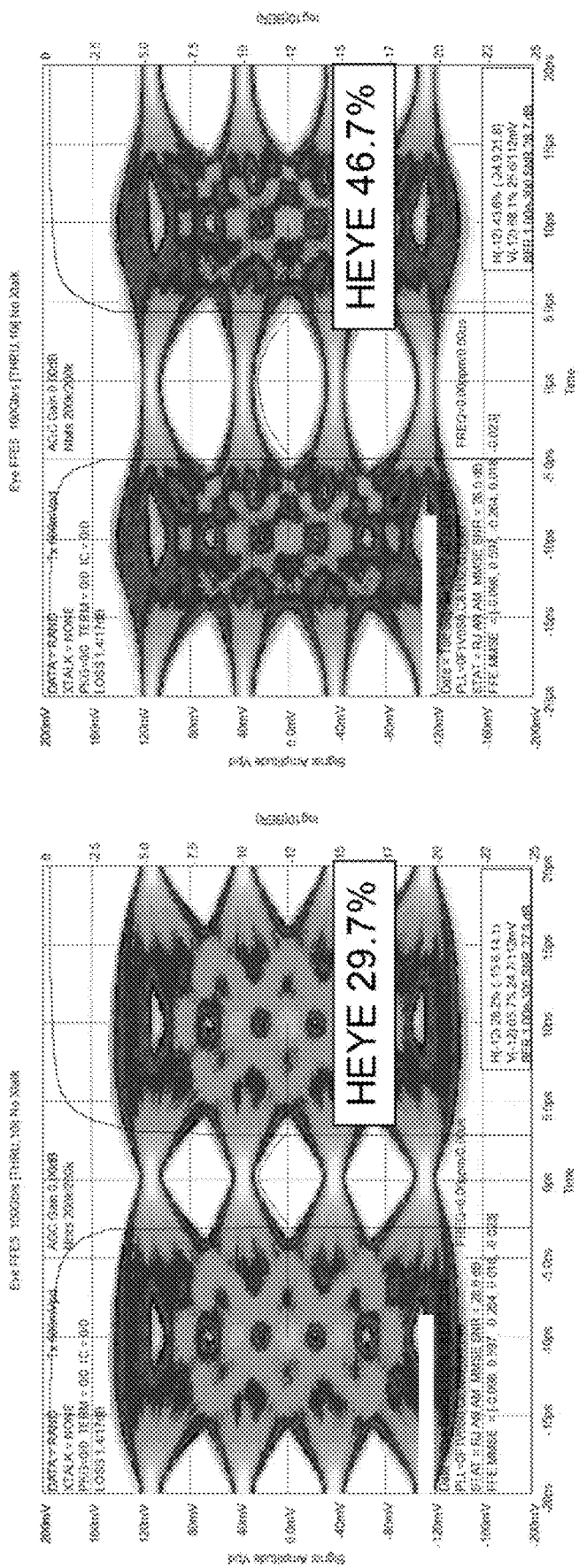
FIG. 7B illustrates an improved HEYE margin achieved with an embodiment of the present disclosure.

FIGS. 6A to 6D illustrate the tap weights for the precursor (i.e., FIG. 6A), the postcursor (i.e., FIG. 6B), the second postcursor (i.e., FIG. 6C), and the third postcursor (i.e., FIG. 6D) of an example 5 tap FFE 100 Gb/s 4 level transmission having 17 dB loss channel. Both the optimal value (solid lines, such as 642) and the linear approximation (dashed lines, such as 644), are illustrated. Thus, FIGS. 6A to 6D illustrate the computation of the time variation of the tap weights across time, and a linear approximation to those tap weights. FIG. 7A illustrates the HEYE marking of 29.7% of the prior art (where the tap weights are fixed), while FIG. 7B illustrates the resulting improved HEYE margin achieved with application of the invention. In this example the HEYE improved from approximately 30% HEYE to 47% HEYE using 4-level data transmission on a nominal 17 dB loss channel.

Figure 8B:
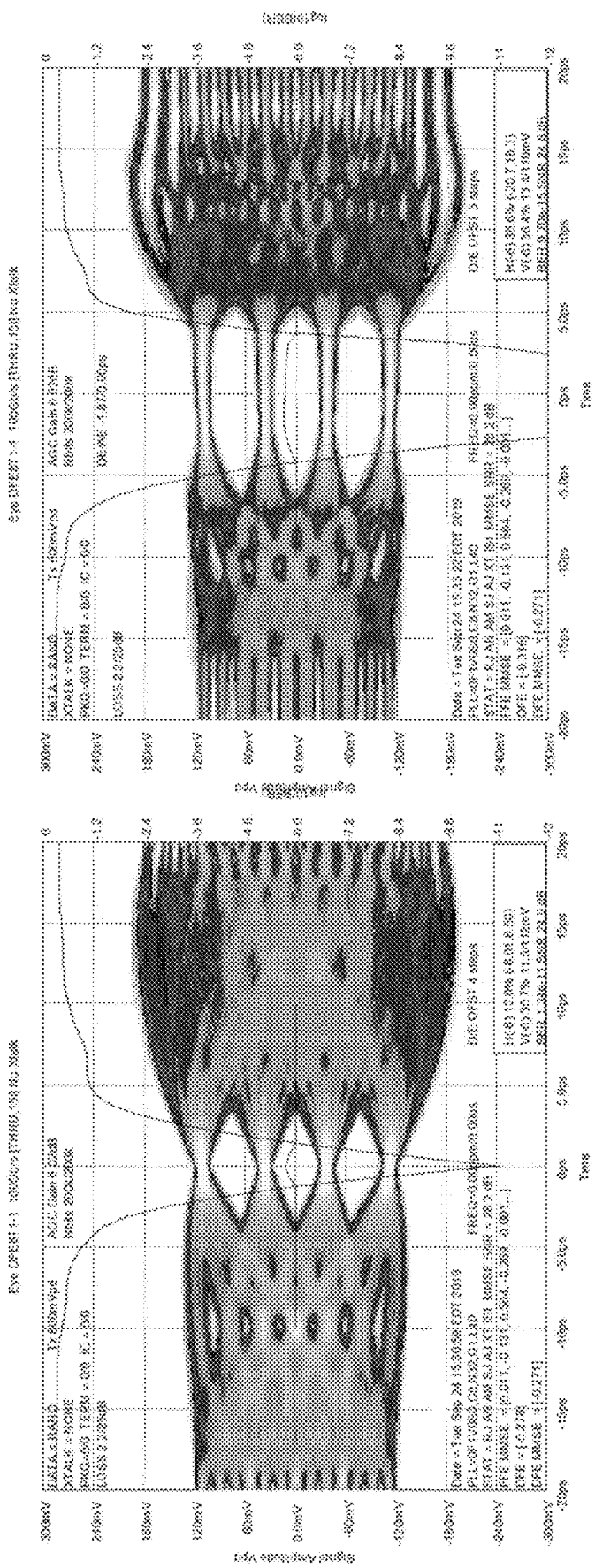
FIG. 8B illustrates an eye diagram of an example time variant feed forward line equalizer where the tap weights are modulated, consistent with an example embodiment.

FIGS. 8A and 8B illustrate eye diagrams of another example time variant feed forward line equalizer having an 8 tap FFE with 2 precursor, Rx DFE1, 100 Gb/s 4 level transmission, 25 dB loss channel, both for the prior art (where the tap weights are fixed) and for an example embodiment. This example is based on a higher loss channel that uses both FFE and DFE equalization, and also adds degradation from clock jitter (i.e., 200 fs RMS random clock jitter) and amplitude noise (i.e., 3 mV RMS amplitude noise). As shown in the comparative eye diagram plots of FIGS. 8A and 8B, the HEYE is improved from 12.5% margin to 39% margin (i.e., over 3× improvement).

Figure 9B:
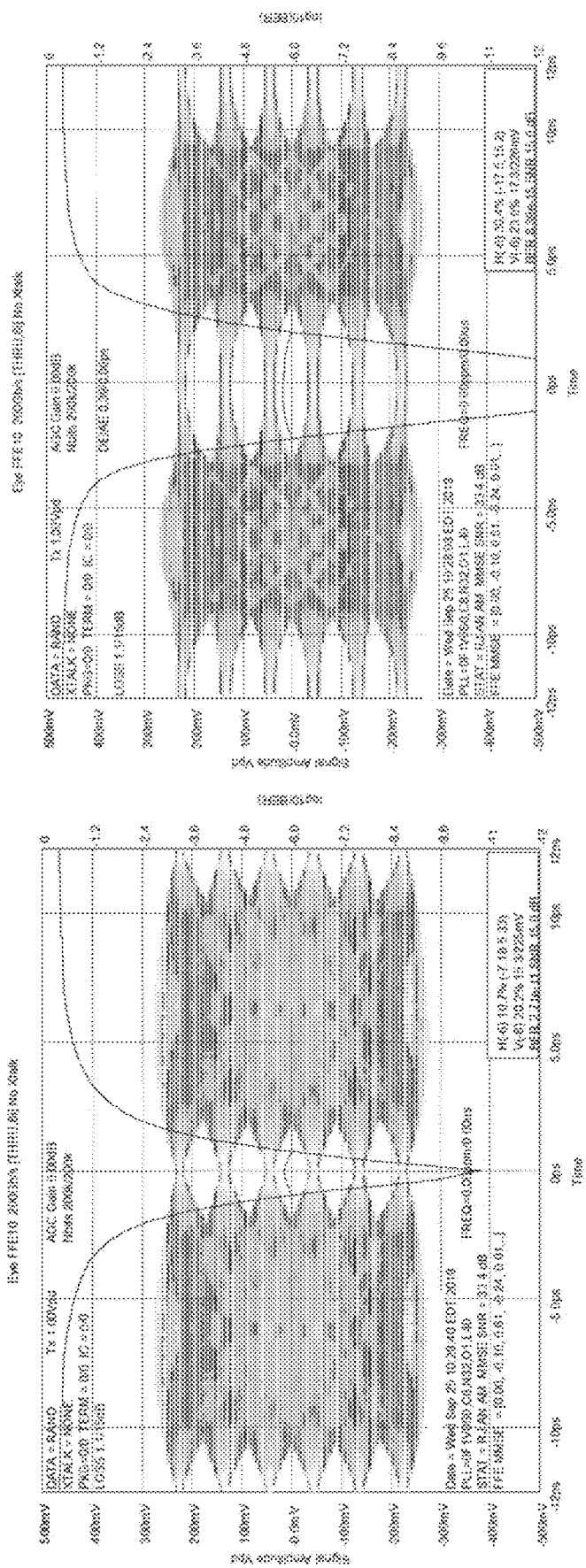
FIG. 9B illustrates an eye diagram of the feed forward line equalizer used in FIG. 9A, where the tap weights are modulated, consistent with an example embodiment.

FIGS. 9A and 9B illustrate eye diagrams of another example time variant feed forward line equalizer having a 200 Gb/s data transmission over a 15 dB loss channel with 200 fs RMS clock RJ and 5 mV RMS amplitude noise, using 32QAM modulation which results in 6-level transmission. In this example, the BER floor is improved from 3E−11 of the prior art of FIG. 9A to 8E−15 of FIG. 9B of an embodiment of the present disclosure, and an HEYE at 1e−6 confidence is increased from 12.5% to 32.7%.

Figure 10B:
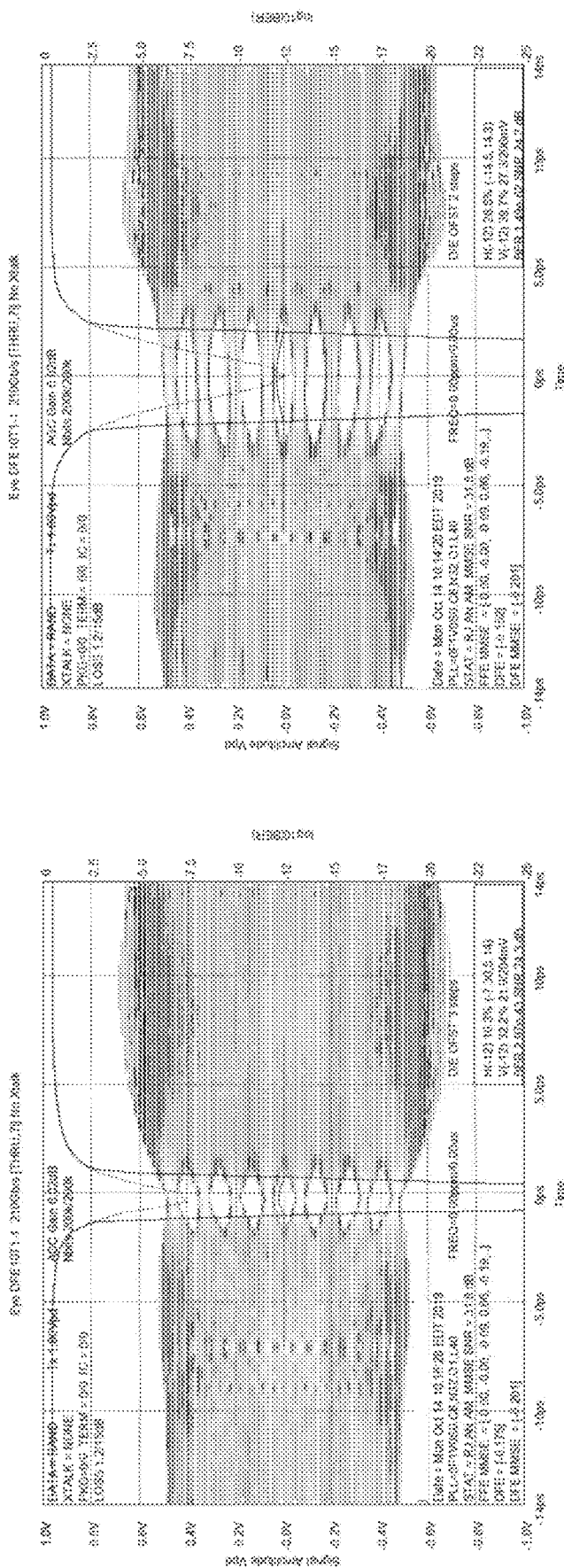
FIG. 10B illustrates an eye diagram of the feed forward line equalizer used in FIG. 10A, where the tap weights are modulated, consistent with an example embodiment.

FIGS. 10A and 10B illustrate eye diagrams of yet another example time variant feed forward line equalizer having a 210 Gb/s 8-level signal transmission over a 15 dB loss channel, with 200 fs RMS clock jitter and 5 mV RMS amplitude noise. In this example, after applying a Reed Solomon error-correction code, HEYE is improved from 12.4% (i.e., prior art of FIG. 10A, where the tap weights are fixed) to 28.8% (i.e., FIG. 10B) using the time-dependent equalizer, consistent with an embodiment of the present disclosure.

Example Process

With the foregoing overview of an example equalizer system 100, example waveforms 302 to 340, and example circuit implementation 400, it may be helpful now to consider a high-level discussion of an example process. To that end, FIG. 11 presents a process 1100 for performing an equalization of a data signal, consistent with an illustrative embodiment. Process 1100 is illustrated as a collection of processes in a logical flowchart, wherein each block represents a sequence of operations that can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process. For discussion purposes, the process 1100 is described with reference to FIG. 4.

By way of example only and not by way of limitation, consider an FFE system that includes an input node operative to receive a data signal, a data clock input, a first tap and a second tap. At block 1104 a clock signal is received. At block 1106, data signal is received at the input node of transmission symbols that change state synchronously with the received clock signal. At block 1108, at least one of the first or second tap weight is modulated by a dynamic control parameter that repeats synchronously with each transmission symbol.

Example Computer Platform

Figure 12:
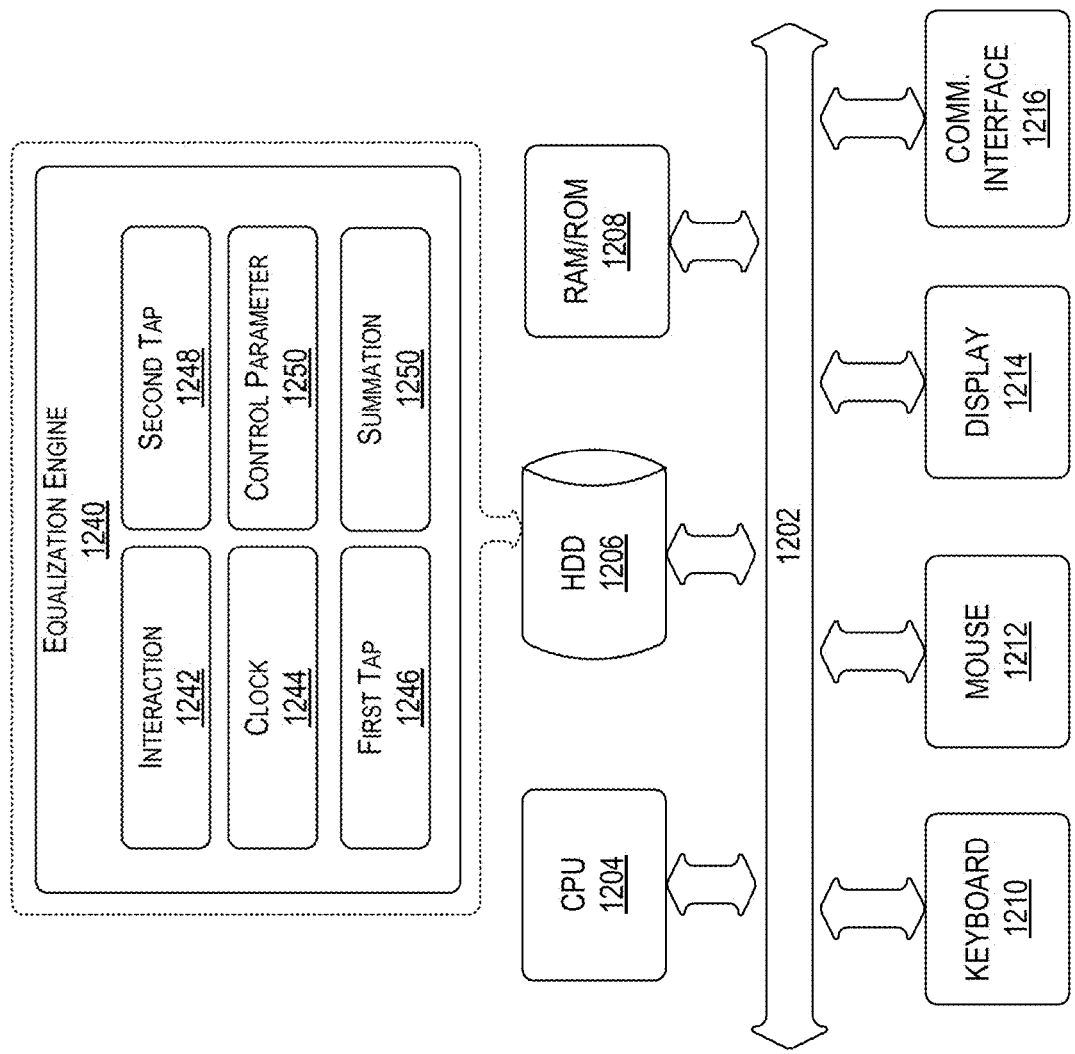
FIG. 12 is a functional block diagram illustration of a computer hardware platform that can communicate with various networked components.

As discussed above, functions relating to equalizing a data signal, as well as other functions discussed herein, can be performed with the use of a controller or computing device. FIG. 12 is a functional block diagram illustration of a computer hardware platform that can communicate with various networked components, that can be used to implement one or more function blocks discussed herein.

The computer platform 1200 may include a central processing unit (CPU) 1204, a hard disk drive (HDD) 1206, random access memory (RAM) and/or read only memory (ROM) 1208, a keyboard 1210, a mouse 1212, a display 1214, and a communication interface 1216, which are connected to a system bus 1202.

In one embodiment, the HDD 1206, has capabilities that include storing a program that can execute various processes, such as the equalization engine 1240, in a manner described herein. The equalization engine 1240 may have various modules configured to perform different functions. For example, there may be an interaction module 1242 that is operative to receive data signals from various sources over a network, wherein the data is to be equalized by the equalization engine 1240.

There may be a clock module 1244 operative to receive a clock signal and/or generate its own clock signal to which the input data is synchronous to. There are two or more taps, represented by way of example as a first tap module 1245 and a second tap module 1248. While two tap modules are illustrated, in various embodiments, there is no limit to the number of taps that are supported by the concepts discussed herein. There may be a control parameter module 1250 operative to control a tap weight of at least one of the first tap 1246 or the second tap 1248. The control parameter module 1250 modulates a tap weight by providing a dynamic control parameter that repeats synchronously with each transmission symbol of the clock. There may be a summation module 1250 operative to sum the tap weights of the first tap and the second tap.

In one embodiment, a program, such as Apache™, can be stored for operating the system as a Web server. In one embodiment, the HDD 1206 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently. For example, any signal discussed herein may be scaled, buffered, scaled and buffered, converted to another state (e.g., voltage, current, charge, time, etc.), or converted to another state (e.g., from HIGH to LOW and LOW to HIGH) without materially changing the underlying control method.

While NFETS and PFETS are illustrated and/or discussed in some of the examples herein, these transistors were provided by way of example only, and not by way of limitation. It will be understood, based on the concepts disclosed herein, that other types of insulated-gate field effect transistors (IGFET) with complementary logic may be used as well. For example, any FETS from columns III-V of the periodic table, including carbon nanotube FETS could be used as well to implement the structures described herein. In some embodiments, bipolar transistors (e.g., PNP or NPN), and/or BiCMOS can be used instead of MOS transistors.

Aspects of the present disclosure are described herein with reference to flowchart illustrations and/or block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A dynamic tap weight generator circuit, comprising:
   a clock generator circuit having a first output and a second output;
   a current interpolator circuit coupled to a first current source and a second current source and to the first and second outputs of the clock generator circuit and operative to provide a first output and a second output providing a differential output current between a current of the first current source and a current of the second current source across a symbol transmission interval;
   a 2:1 current multiplexer coupled to the first and second outputs of the current interpolator circuit; and
   a tap weight driver coupled to an output of the 2:1 current multiplexer and configured to dynamically modulate a tap weight of an equalizer during each clock cycle of the clock generator.

2. The dynamic tap weight generator circuit of claim 1, wherein:
   the first output of the clock generator circuit is a substantially triangular waveform; and
   the second output of the clock generator circuit is a substantially rectangular waveform that is synchronous to the first output of the clock generator circuit.

3. The dynamic tap weight generator circuit of claim 1, wherein the first and second outputs of the clock generator circuit are differential.

4. The dynamic tap weight generator circuit of claim 3, wherein the current interpolator circuit comprises:
   a first transistor and a second transistor having a common first node coupled to the first current source; and
   a third transistor and a fourth transistor having a common first node coupled to the second current source, wherein:
     a control node of the first transistor and a control node of the fourth transistor are coupled to a positive terminal of the first output of the clock generator circuit; and
     a control node of the second transistor and a control node of the third transistor are coupled to a negative terminal of the first output of the clock generator circuit.

5. The dynamic tap weight generator circuit of claim 1, wherein:
   the first current source provides a starting current for the current interpolator circuit; and the second current source provides a stopping current for the current interpolator circuit.

6. The dynamic tap weight generator circuit of claim 1, wherein the 2:1 current multiplexer comprises:
   a first multiplexer transistor and a sixth second multiplexer transistor having a common first node coupled to the first output of the current interpolator circuit; and
   a third multiplexer transistor and a fourth multiplexer transistor having a common first node coupled to the second output of the current interpolator circuit, wherein:
      a control node of the first multiplexer transistor and a control node of the fourth multiplexer transistor are coupled to a positive terminal of the second output of the clock generator circuit; and
      a control node of the second multiplexer transistor and a control node of the third multiplexer transistor are coupled to a negative terminal of the second output of the clock generator circuit.

7. The dynamic tap weight generator circuit of claim 6, wherein:
   a second node of the first multiplexer transistor and a second node of the fourth multiplexer transistor are coupled to ground; and
   a second node of the second multiplexer transistor and a control node of the third multiplexer transistor are coupled to a catch diode.

8. The dynamic tap weight generator circuit of claim 7, wherein the catch diode comprises an N-Channel Field Effect Transistor (NFET) having its gate coupled to its drain, and its source coupled to ground.

9. The dynamic tap weight generator circuit of claim 8, wherein the full-rate tap weight driver comprises:
   a first NFET having its gate coupled to a tap polarity control, its drain coupled to a first termination load;
   a second NFET having its gate coupled to a tap polarity control, and its drain coupled to a second termination load; and
   a third NFET having its drain coupled to emitters of the first and second NFETS of the full-rate tap weight driver, its gate coupled to the gate of the catch diode.

10. The dynamic tap weight generator circuit of claim 1, wherein the first current source provides a starting current $I_{START}$ and the second current source provides a stopping current source $I_{STOP}$.

11. The dynamic tap weight generator circuit of claim 1, wherein the dynamic tap weight generator circuit is part of a feed forward equalizer (FFE) and configured to control a tap weight of at least one of the taps of the FFE.

12. The dynamic tap weight generator circuit of claim 1, wherein the dynamic tap weight generator circuit is part of a transmitter circuit.

13. The dynamic tap weight generator circuit of claim 1, wherein the dynamic tap weight generator circuit is part of a receiver circuit.

14. The dynamic tap weight generator circuit of claim 1, wherein an adjustment of the tap weight at the output of the dynamic tap weight generator circuit is a linear ramp during each clock cycle of the clock generator circuit.

15. The dynamic tap weight generator circuit of claim 1, wherein an adjustment of the tap weight at the output of the dynamic tap weight generator circuit is a is a non-linear function.

16. The dynamic tap weight generator circuit of claim 1, wherein first, second, third and fourth transistors of the current interpolator circuit are N-Channel Field Effect Transistor (NFET) devices.

17. The dynamic tap weight generator circuit of claim 16, wherein fifth, sixth, seventh and eighth transistors of the 2:1 current multiplexer circuit are N-Channel Field Effect Transistor (NFET) devices.

18. A method of providing a dynamic tap weight, comprising:
   providing a circuit having a clock generator, current interpolator coupled to the clock generator, and a current multiplexer coupled to the current interpolator and the clock generator;
   providing a first clock signal to the current interpolator and a second clock signal to the current multiplexer, by the clock generator;
   providing a first output current and a second output current interpolated between a current of a first current source and a current of a second current source, across a symbol transmission interval, by the current interpolator, based on the first clock signal;
   multiplexing the first output current and the second output current of the current interpolator, based on the second clock signal; and
   providing a full-rate tap weight driver coupled to an output of the current multiplexer operative to provide a differential output of a control parameter that repeats synchronously with each transmission symbol to dynamically modulate a tap weight of an equalizer.

19. The method of claim 18, wherein:
   the first output of the clock generator is a substantially triangular waveform; and
   the second output of the clock generator is a substantially rectangular waveform that is synchronous to the first output of the clock generator.

20. The method of claim 18, wherein the first and second outputs of the clock generator are differential.

21. The method of claim 18, wherein:
   the first current source provides a starting current for the current interpolator circuit; and
   the second current source provides a stopping current for the current interpolator circuit.

* * * * *